United States Patent
Birsan et al.

(10) Patent No.: US 7,131,066 B1
(45) Date of Patent: Oct. 31, 2006

(54) XML BASED SYSTEM FOR UPDATING A DOMAIN MODEL AND GENERATING A FORMATTED OUTPUT

(75) Inventors: Dorian Birsan, Toronto (CA); Sheldon Lee-Loy, Markham (CA); Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 09/644,819

(22) Filed: Aug. 23, 2000

(30) Foreign Application Priority Data

Jun. 15, 2000  (CA) .................................... 2311870

(51) Int. Cl.
*G06F 13/00* (2006.01)

(52) U.S. Cl. ...................... 715/523; 715/513; 709/201; 709/203

(58) Field of Classification Search ................ 715/513, 715/523; 707/10; 709/227, 203, 201; 395/701
See application file for complete search history.

(56) References Cited

U.S. PATENT DOCUMENTS

| | | | | |
|---|---|---|---|---|
| 5,748,186 A | * | 5/1998 | Raman | ..................... 715/500.1 |
| 5,875,331 A | * | 2/1999 | Lindsey | ..................... 717/108 |
| 5,970,490 A | * | 10/1999 | Morgenstern | ................. 707/10 |
| 6,094,684 A | * | 7/2000 | Pallmann | ..................... 709/227 |
| 6,404,445 B1 | * | 6/2002 | Galea et al. | ................. 715/853 |
| 6,418,446 B1 | * | 7/2002 | Lection et al. | .......... 707/103 R |
| 6,449,620 B1 | * | 9/2002 | Draper et al. | ................. 707/102 |
| 6,484,150 B1 | * | 11/2002 | Blinn et al. | ..................... 705/26 |
| 6,507,856 B1 | * | 1/2003 | Chen et al. | ................. 715/513 |
| 6,519,617 B1 | * | 2/2003 | Wanderski et al. | ......... 715/513 |
| 6,738,951 B1 | * | 5/2004 | Weiss et al. | ................. 715/523 |
| 2004/0210556 A1 | * | 10/2004 | Brooke et al. | ................. 707/1 |
| 2005/0102608 A1 | * | 5/2005 | Batres | ........................ 715/505 |

\* cited by examiner

*Primary Examiner*—Heather R. Herndon
*Assistant Examiner*—Matthew Ludwig
(74) *Attorney, Agent, or Firm*—William A. Kinnaman, Esq.; Kevin P. Radigan, Esq.; Heslin Rothenberg Farley & Mesiti, P.C.

(57) ABSTRACT

A system for updating a domain model and generating a formatted output is disclosed. The system comprises a template driven emitter which processes a template file. The template file comprises directives which direct extraction of data from a source data model into a target data model. The template file also comprises directives for manipulating the DOM tree of the data model. The template driven emitter generates a DOM tree for the source data model and a DOM tree for the template file. The template driven emitter utilizes the DOM tree to navigate the data model and extract data as specified according to the directives in the template file. The template file is written as a text file and expressed in XML.

15 Claims, 7 Drawing Sheets

XML BASED SYSTEM FOR UPDATING A DOMAIN MODEL AND GENERATING A FORMATTED OUTPUT

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent Office patent files or records, but otherwise reserves all copyrights whatsoever.

COMPUTER PROGRAM LISTING APPENDICES ON COMPACT DISC

A computer program listing on Compact Disc, containing Appendices I & II, is filed herewith and is incorporated herein by reference in its entirety. In particular, Appendix I is 32,768 bytes (as stored on disc), and Appendix II is 235,520 bytes (as stored on disc). Appendices I & II were stored to the enclosed CD-ROM on Apr. 15, 2004 (i.e., date of creation).

TECHNICAL FIELD

This invention relates, in general, to object oriented programming systems, and more particularly to a system for updating a domain model and generating a formatted output.

BACKGROUND ART

Hyper Text Markup Language or HTML is synonymous with the Internet and the World Wide Web (WWW). HTML allows structural markup of WWW or 'Web' documents. XML or extensible Markup Language is well known in the art as a document markup language which offers human-readable semantic markup and is also machine-readable. As a result, XML provides the capability to create, parse and process networked data.

XML documents are composed of entities, which are storage units containing text and/or binary data. Text is composed of character streams that form both the document's character data content and the document's meta-data markup. The markup describes the document's storage layout and logical structure. XML also provides a markup mechanism to impose constraints on the storage layout and logical structure of documents, and it provides mechanisms that can be used for strong typing.

In style and structure, XML documents look quite similar to HTML documents. However, when a Web server with XML content prepares data for transmission, the Web server must generate a context wrapper with each XML fragment, including pointers to an associated Document Type Definition (DTD) and one or more style sheets for formatting. Clients for the Web server that process XML must be able to unpack the content fragment, parse the fragment in the context according to the DTD (if needed), render (if needed) in accordance with the specified style sheet guidelines, and correctly interpret the hypertext semantics (e.g. links) associated with each of the different document tags. It is understood that a DTD is not required for an XML document, instead, the author can simply use an application-specific tagset. However, a DTD is useful because it allows applications to validate the tagset for proper usage. The DTD specifies the set of required and optional elements and their attributes for documents to conform to that type. In addition, the DTD specifies the names of the tags and the relationships among elements in a document, for example, nesting of elements.

One of the main issues during the development of XML was expressing data stored in XML documents into various formats. This has given rise to the development of languages and standards such as XSL and XSLT from W3C. By using an XSL style sheet one is able to create an HTML representation of an XML document. Similarly, XSL style sheets are used to transform XML documents into an HTML representation. XSL implementations suffer two principal limitations. First, XSLT requires the definition of rules to transform specific types of XML elements into some other type of XML like structure. Although the result may simply comprise a stream, the navigation rules must be defined based on types and the execution of the navigation rules is based on the degree of uniqueness of the navigation. In other words, the execution is not a simple procedural operation. Secondly, XSLT has no formatting capability which means that formatting is performed using flow/format objects in XSL and is geared towards HTML forming. Therefore, the XSL standards fall short for generating code or non-*ML output from a data model.

Another issue is concerned with the transformation of XML data. Frequently, XML data needs to be transformed into another valid XML format. This often comprises an update activity not a creation activity. The updates are made to specific pre-existing XML data, for example, converting selected strings into an alternate format, which is not the same as creating a new document. To be effective, the transformation needs to include an efficient navigation mechanism.

Accordingly, there remains a need for a mechanism for navigating a data model and extracting specific data from the data model.

SUMMARY OF THE INVENTION

The shortcomings of the prior art are overcome and additional advantages are provided through the provision of a system for updating a domain model and generating a formatted output. The system provides two principal functions: (a) text format generation from a source data model; and (b) manipulation of the DOM tree for the domain model.

The system provides the capability to navigate a source data model and extract specific data from the source data model to a target data model. The system utilizes a template driven mechanism and directives are provided to navigate the source data model and to change the flow of control of the template. The source data model includes read-only data that is extracted and used to generate the target data model. Directives are also provided to navigate the target data model.

Through the provision of a set of "structure walking directives" and a set of basic "string formatting" directives, a user can write a procedural sequence of instructions to quickly extract data from a XML source data model (e.g. an XML document) and format the extracted data into a desired stream for a target data model. The target data model may comprise a simple ASCII file, or an HTML file, or generated content of some other file format. The mechanism according to the invention provides a target data model without restrictions.

According to another aspect of the invention, the mechanism, i.e. directives, is implemented utilizing XML thereby providing a language interface which is natural to most users.

In a first aspect, the present invention provides a mechanism for manipulating information in a source data model and creating a target data model, the mechanism includes, (a) a template module having a directive to manipulate selected data in the source data model; (b) a template processing module to process the directive contained in the template module; and (c) the template processing module further includes a component to generate a DOM tree for navigating the template module to manipulate said source data model.

In another aspect, the present invention provides a method for manipulating selected data in a source data model, the method comprises the steps of: (a) defining a template file having a directive specifying the data to be extracted from the source data model; (b) generating a DOM tree for navigating the template file; and (c) navigating the template file and applying the directive to manipulate selected data in the source data model.

In yet another aspect, the present invention provides a computer program product for an application program for creating objects, the application program includes a utility for manipulating information in a source data model and creating a target data model, the computer program product comprises: a recording medium; means recorded on the medium for instructing a computer to perform the steps of, (a) defining a template file having a directive specifying the data to be extracted from the source data model; (b) generating a DOM tree for navigating the template file; and (c) navigating the template file and applying the directive to manipulate selected data in the source data model.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
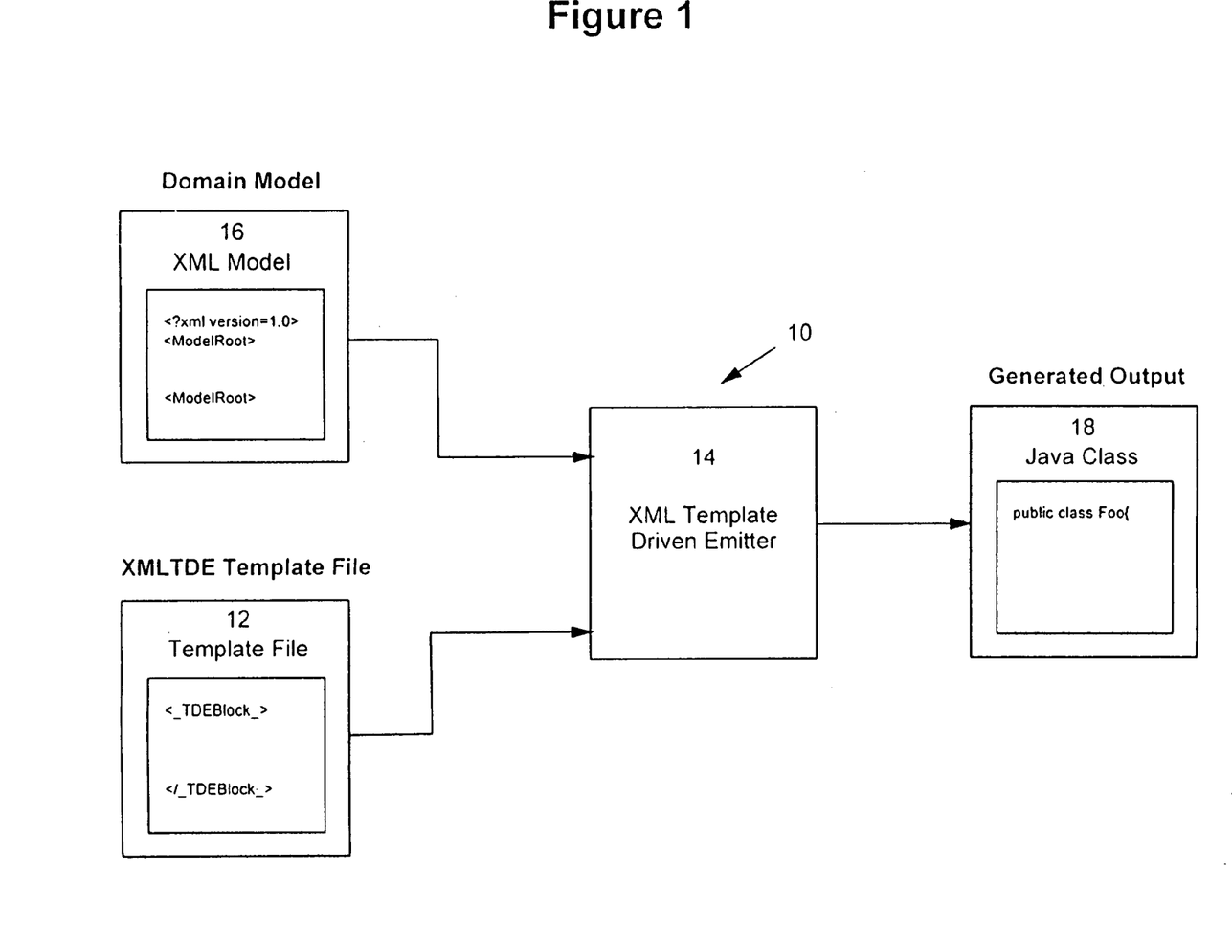
FIG. 1 shows in diagrammatic form a system for updating a domain model and generating a formatted output in accordance with the present invention.

Reference is first made to FIG. 1 which shows in diagrammatic form a mechanism according to the present invention for updating a domain model and generating a formatted output. The mechanism comprises a template-driven implementation. In the preferred embodiment, the mechanism is in an application development program for creating objects, etc., according to object-oriented principles and the domain models and trees define an object model.

The mechanism is indicated generally by reference 10 and comprises a template file or module 12 and a template driven emitter or template processing module 14. As will be described in more detail below, the template driven emitter 14 applies the template file 12 to a domain model 16 to produce a generated output file 18. In the context of the present invention, the domain model 16 comprises a source data model and the generated output file 18 comprises a target data model. The source data model 16 contains read-only data which is extracted by the mechanism 10 and used to generate a formatted output, i.e. the target data model 18. The target data model 18 contains both read/write data that is manipulated by the mechanism 10. According to the invention, the mechanism 10 provides the capability to navigate the data models 16, 18 and also manipulate the target data model 18.

The template file 12 is created as a text file with directives that navigate the source data file 16 and navigate and manipulate the target data file 18. While the mechanism 10 is described in the context of an XML based data model 16, the mechanism 10 is not concerned with the structure of the model 16. The template file 12 is created using a conventional editor. The mechanism 10 only responds to navigational, substitution and emit directives contained in the template files 12. As will be described in more detail below, the data model 16 is traversed in a symbolic fashion, i.e. naming the object relationships as strings, rather than direct object references. The attribute values are retrieved in the same fashion, i.e. by naming the attribute in a string.

In the preferred embodiment, the template file 12 is expressed in XML format and comprises directives and macros. The specification of the document type definition (DTD) for the template file 12 is provided below in Appendix I. The directives are commands or rules that define the flow of control. The macros provide for string manipulation. The mechanism 10 includes domain model navigation directives, domain model manipulation directives, output manipulation directives, logical operation directives, and code section directives. The domain model navigation directives are used to navigate the domain model (i.e. the source data model 16). The domain model manipulation directives are used to modify the domain model (i.e. target data model 18). The output manipulation directives are used to modify the generated output in the target data model 18. The logical operation directives are used to change the logical processing of a template file 12. The code section directives are used to maintain code sections in the generated output (i.e. target data model 18). A full listing of the directives is provided below in Appendix II.

As described above, the source data model (i.e. domain model 16 in FIG. 1) contains read-only data that the mechanism 10 can extract and use to generate a formatted output (i.e. the target data model 18). A feature of the mechanism 10 according to the present invention is the ability to manipulate the target data model 18. According to this aspect of the invention, the target data model 18 contains read/write data which can be manipulated according to directives contained in the template file 12. A full listing of the directives is provided below in Appendix II, and directives for manipulating the target data model 18 include updatetargetscope, targetscope, addtargetscope, and removetargetscope.

The updatetargetscope directive is used to update an element of a DOM tree associated with a domain model. If the element does not exist it is inserted into the DOM tree.

The syntax for the updatetargetscope directive is shown below in Appendix II. The following example describes the operation of the updatetargetscope directive:

Suppose the model defines an element "Class" which has two other embedded elements. This document (i.e the source data file 16) is called "class.xml".

```
class.xml
<Class name="Set">
<Method name="add">
</Method>
<Method name="del">
</Method>
</Class>
```

Also consider the following template (i.e. template file 12):

```
<?xml version="1.0"?>
<!DOCTYPE _TDEBlock_ SYSTEM "dtd/tde.dtd">
<_TDEBlock_ DOMTree="class.xml">
<define MACRO=newMethodName>addNew</define>
<targetscope NAME="Method">
<updatetargetscope NAME="name" TYPE="ATTRIBUTE">$newMethodName$</updatetargetscope>
</targetscope>
</_TDEBlock_>
```

The resulting DOM tree when the template is applied to the document "class.xml" is as follows:

```
<Class name="Set">
<Method name="addNew">
</Method>
<Method name="del">
</Method>
</Class>
```

It will be appreciated that the name of the first method changes from "add" to "addNew".

The targetscope directive is used to navigate to an element that is part of an existing DOM tree associated with. The syntax for the targetscope directive is described below in Appendix II. The following example illustrates the operation of the targetscope directive:

Suppose the model defines an element "Class" which has two other embedded elements. This document (i.e. the source data file 16) is called "class.xml".

```
class.xml
<Classlist>
<Class name="Set">
<Method name="add">
</Method>
<Method name="del">
</Method>
</Class>
</Classlist>
```

Also consider the following template (i.e. the template file 12):

```
<?xml version="1.0"?>
<!DOCTYPE _TDEBlock_ SYSTEM "dtd/tde.dtd">
<_TDEBlock_ DOMTree="class.xml">
<targetscope NAME="Class">
</targetscope>
</_TDEBlock_>
```

The template driven emitter 14 navigates to the Class element in the class.xml document. It will be understood that no emitted output is created since this directive just navigates the target data model 18 (i.e. the target document). In this case the targeted XML document is class.xml.

The addtargetscope directive is used to insert an element into a DOM tree associated with a domain model. The syntax for the addtargetscope directive is described below in Appendix II. The following example illustrates the operation of the addtargetscope directive.

Suppose the model defines an element "Class" which has two other embedded elements. This document (i.e. the source data file 16) is called "class.xml".

```
class.xml
<Classlist>
<Class name="Set">
<Method name="add">
</Method>
<Method name="del">
</Method>
</Class>
</Classlist>
```

Also consider the following template (i.e. the template file 12):

```
<?xml version="1.0"?>
<!DOCTYPE _TDEBlock_ SYSTEM "dtd/tde.dtd">
<_TDEBlock_ DOMTree="class.xml">
<targetscope NAME="Class">
<addtargetscope NAME="Method">
<addtargetscope NAME="Argument"></addtargetscope>
</addtargetscope>
</targetscope>
</_TDEBlock_>
```

The resulting DOM tree when the template is applied to the document "class.xml" is as follows:

```
<ClassList>
<Class name="Set">
<Method>
<Argument/>
</Method>
<Method name="add">
</Method>
<Method name="del">
</Method>
</Class>
</Classlist>
```

The removetargetscope directive is used to delete an element from a DOM tree associated with a domain model. The syntax for the removetargetscope directive is shown below in Appendix II. The following example describes the operation of the removetargetscope directive:

Suppose the model defines an element "Class" which has two other embedded elements. This document (i.e. the source data file 16) is called "class.xml".

```
class.xml
<Class name="Set">
<Method name="add">
</Method>
<Method name="del">
```

```
</Method>
</Class>
```
Also consider the following template (i.e. the template file 12):
```
<?xml version="1.0"?>
<!DOCTYPE _TDEBlock_ SYSTEM "dtd/tde.dtd">
<_TDEBlock_ DOMTree="class.xml">
<removetargetscope NAME="Method"/>
</_TDEBlock_>
```
The result of when the template is applied to the document "class.xml" is as follows:
```
<Class name="Set">
<Method name="del">
</Method>
</Class>
```

It will be appreciated that the first method element was removed. Since no index was specified the default value for the index is 0.

It will be appreciated that these directives are very useful in applications, such as "Web" applications and database applications, which require updating of a model stored in XML or a model stored in a database. The other directives included in the mechanism 10 according to the present invention are described below in Appendix II.

The mechanism 10 also includes XML specific directives such as updatetargetdoctype. These XML specific directives are for working with data models that are stored as XML (unlike other directives which are not XML data model specific).

The updatetargetdoctype directive is used to update the !DOCTYPE element of a DOM tree associated with a domain model. If the element does not exist it is inserted into the DOM tree. The syntax of the updatetargetdoctype is described in Appendix II below. The operation of the updatetargetdoctype is illustrated by the following example which involves adding a simple !DOCTYPE element (additional examples are provided in Appendix II).

Consider the following template file:
```
<?xml version="1.0"?>
<!DOCTYPE _TDEBlock_ SYSTEM ". . . / . . . / . . . / . . . /dtd/tde.dtd">
<_TDEBlock_>
<updatetargetdoctype PUBLIC_NAME="Chemistry"
PUBLIC_URL="http://sunsite.unc.edu/public/chemistry.dtd"
ROOT_ELEMENT_NAME="myroot"/>
</_TDEBlock_>
```
The result of when the template is applied is as follows:
```
<?xml version="1.0" standalone="no"?>
<!DOCTYPE myroot PUBLIC "Chemistry"
"http://sunsite.unc.edu/public/chemistry.dtd">
```
The mechanism 10 according to the present invention also includes macro transformations. A macro associates a name with a set of values and enables string substitution within the template file 12. The macro transformations are useful in situations that require text to be changed to uppercase, lowercase, truncated, etc. The following macro transformations are provided in the mechanism 10: toupper, tolower, truncate, separate, strip, stripTrailing, stripLeading, change in_pattern out_pattern, numWords, words[i], and word[i].

The toupper macro converts the macro value to all upper case letters. If an optional parameter 'i' (as described in Appendix II) is specified, then only the i'th character is converted to upper case. The tolower macro converts the macro value to all lower case letters. If the optional parameter 'i' is specified in that case, then only the i'th character is converted to lower case. The truncate macro truncates the macro value to a specified parameter 'maxlen' characters long by removing vowels. If no maxlen parameter is specified, then the macro truncates to the default of 8 characters. The separate macro separates the values in a multivalue macro by separator. If the separator is a string/character, the separator must be enclosed by quotes ''. Otherwise it is assumed to be a macro name and the value of that macro is used as the separator. It is to be noted that when used in a <repeat> statement, repeat blocks are separated by a separator. The strip macro removes all leading and trailing white space characters from the macro value. If a string pattern is specified (either as a string or a macro name), the pattern will be stripped off from the macro value. The stripTrailing macro removes all trailing white space characters from the macro value. An optional pattern to strip may be specified. The stripLeading macro removes all leading white space characters from the macro value. An optional pattern to strip may be specified. The change in_pattern out_pattern macro replaces every occurrence of the in_pattern in the macro value with out_pattern. Strings/characters must be enclosed by quotes, otherwise the parameter is assumed to be a macro name and the value of that macro will be used. The increment macro increments the value of the macro by one. If an optional parameter 'i' is specified, then the increment step is defined by 'i'. The numwords macro returns the number of words in a string. For example, if the string contains "This is an apple pie", then the macro numWords returns '5'. The words[i] macro returns the string after the i'th word inclusively. For the previous example, words [3] would return "an apple pie". The word[i] macro returns the ith word in a string. For the previous example, the macro word[3] would return "an". The macro transformations included in the mechanism 10 according to the present invention are further described in Appendix II.

According to another aspect, the mechanism 10 utilizes a "tree" navigation scheme to perform transformations in the source data model 16 (and the target data model 18). As will be described in more detail below, to apply a transformation to a node in the data model 16 or 18, the mechanism 10 first navigates the root node for the data model, then down to the child node until the specific node of interest is located. Once located, the transformation rule(s) is applied to the node. As tree navigation is not data model specific, the mechanism 10 according to the present invention is advantageously flexible and can support various data model types other than XML.

The mechanism 10 also includes a facility for code sections. The code sections are analogous to methods and have application for reusing templates, or for overriding other code sections with the same name. The code sections comprise the directives code and call, which are described in more detail in Appendix II.

Reference is next made to FIGS. 2 to 5 which show the method steps embodied in processing the template file 12 according to the present invention.

Figure 2:
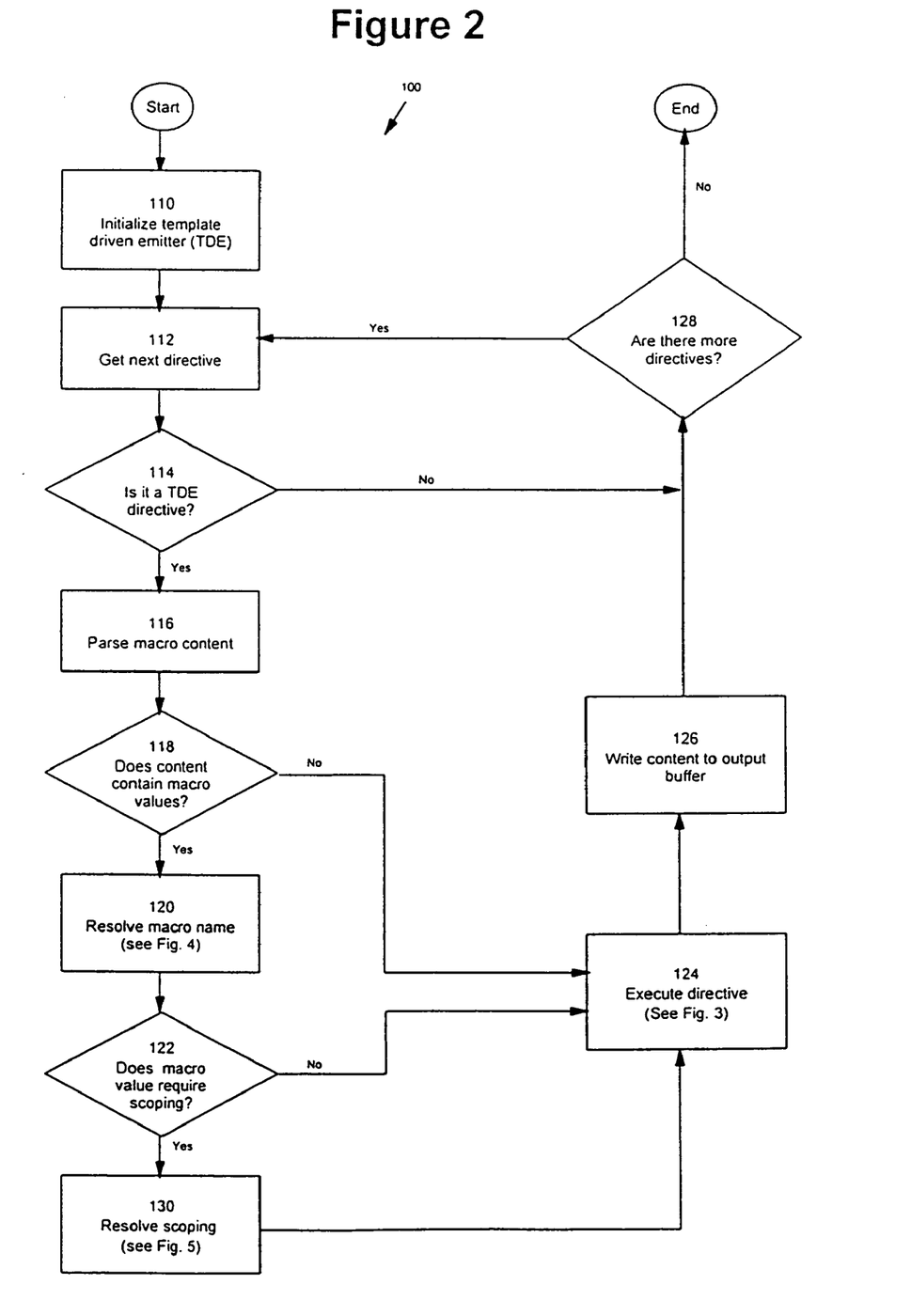
FIG. 2 shows in flowchart form the method steps for processing directives according to the present invention.

FIG. 2 shows in flow chart form the method steps embodied in the mechanism 10 for processing directives according to the present invention. The method steps comprise a process which is indicated generally by reference 100 in FIG. 2. As described above, the directives for navigating and/or manipulating the data model are contained in the template file 12 (FIG. 1), and the template file 12 is processed by the template driven emitter 14 (FIG. 1). The first step as indicated by block 110 in FIG. 2 involves initializing the template driven emitter 14, which in the preferred embodiment is capable of processing XML documents and templates. Initialization of the template driven emitter 14 includes the following operations: creating and populating a macro table with predefined macros (which will be used for string substitution in the template file) and creating a code section table (which will be populated with code sections, defined by name using the code directive, that will be emitted on the occurrence of a call directive using the code sections' name(s)). Additionally, the template driven emitter generates a DOM tree for the template file and for the source data model, both trees used for navigating respectively the template file and the source data model. DOM or document object model is an API for HTML and XML documents established through the W3C Organization. DOM defines the logical structure of documents and the way a document is accessed and manipulated. See http://www.w3.org/dom for more information. As used herein, DOM trees are understood as used in the context of the DOM specification but need strictly follow the DOM specification. Indeed, as used herein, DOM trees could be trees according to conventional understandings or defined according to other non-DOM specifications.

The next step (block 112) in the process 100 involves getting the first or next directive from the template file 12. As described above, the template file 12 is created as a text file with the directives specified according to the definitions contained in Appendix II. The next step in decision block 114 involves ascertaining whether the directive is a directive for the template driven emitter 14. (It will be appreciated that only template driven emitter directives can drive the operation of the template driven emitter 14.) If the directive retrieved in step 112 is not a template driven emitter (TDE) directive, then a check (decision block 128) is made to determine if there any further directives in the template file 12. If no, then the process 100 for processing the template file 12 is terminated. If yes, then the next directive in the template file 12 is retrieved (step 112) and a check is made to ascertain if the directive is a TDE directive (decision block 114).

Referring to FIG. 2, if the directive is a TDE directive (as determined in decision block 114), then the next step (block 116) in the process 100 involves parsing the content of the directive for any macros which may be included. If the content does include a macro value (decision block 118), then a process 300 for resolving the macro name is invoked in the block 120. The result of the macro name process 300 is a macro value for the macro name. The macro name resolving process 300 is described below with reference to FIG. 4. As shown in FIG. 2, the next step in the process 100 involves determining if the macro value returned from the process 300 requires scoping (decision block 122). If the macro value requires scoping, then a process 400 for scoping the macro value is invoked in block 130. The macro value scoping process 400 is described in more detail below with reference to FIG. 5. Once the macro value has been scoped, the directive is executed as indicated by block 124 in FIG. 2. If the macro value does not require scoping as determined in decision block 122, then the next step is also executing the directive in block 124. If the directive does not contain a macro value as determined in decision block 118, then processing also proceeds to executing the directive in block 124. In block 124, the directive is executed 200 as will be described in more detail with reference to FIG. 3 below. The result of executing the directive, i.e. content, is written to an output buffer as indicated in block 126. Next, a check is made in decision block 128 to ascertain if there any more directives in the template file 12. If there are more directives in the template file 12, then the processing steps starting at block 112 are repeated as described above. If there are no more directives, then the processing of the template file 12 is completed and the process 100 ends.

The processing of the template file 12 (FIG. 1) is implemented in the template driven emitter 14 (FIG. 1) as will be apparent to one skilled in the art based on the foregoing description.

Figure 3:
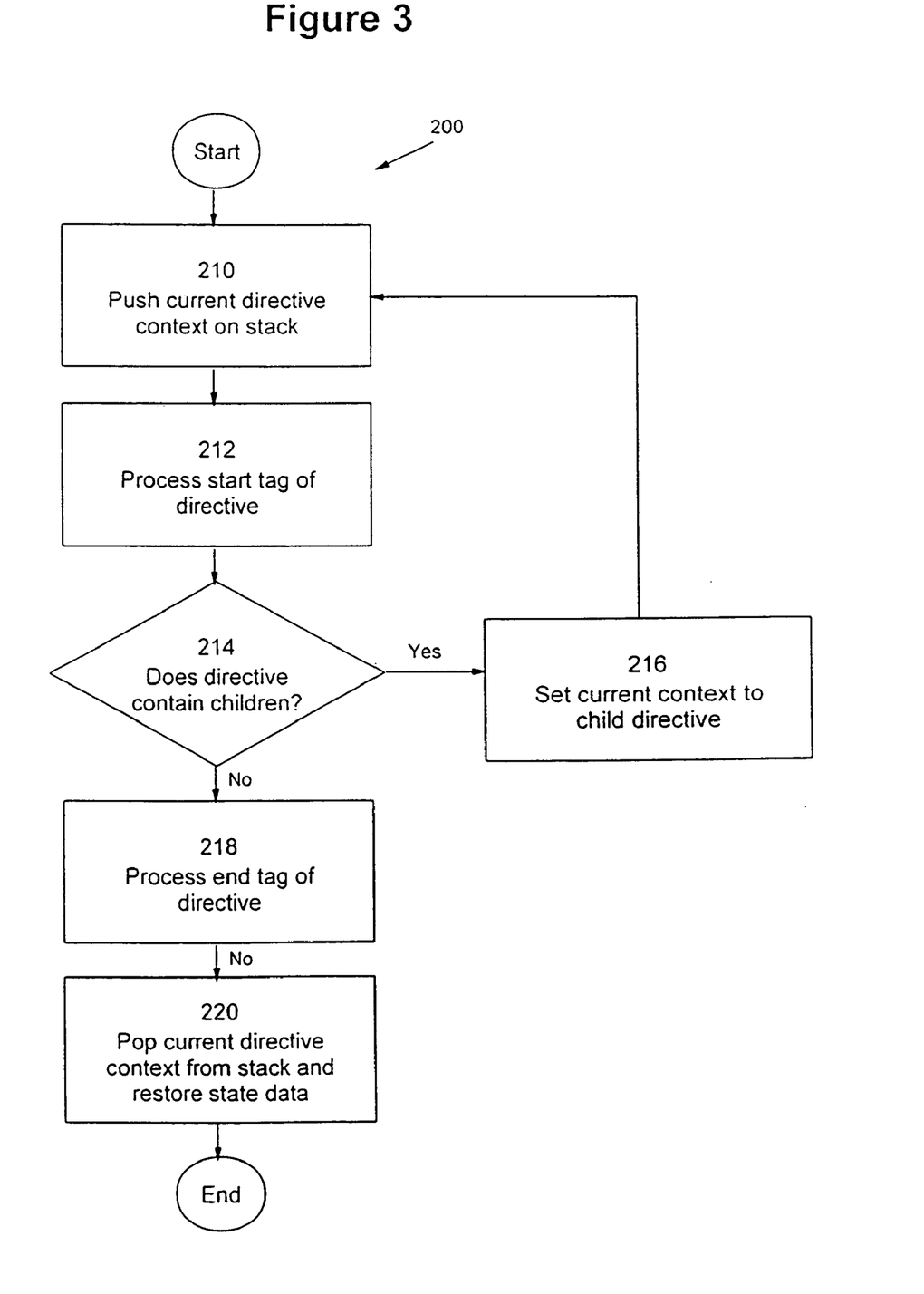
FIG. 3 shows in flowchart form the method steps for executing directives according to the present invention.

Reference is next made to FIG. 3, which shows the method steps embodied in a process for executing the directive as indicated by block 124 (FIG. 2). As shown in FIG. 3, the process for executing the directives is indicated generally by reference 200. The directives are processed according the definitions found in Appendix II. The first operation in the process 200 involves pushing the current directive context onto a stack as indicated in block 210. Next, the start tag of the directive is processed (block 212) by, among other things, parsing the directive and performing the steps required to execute the action of the directive in accordance with the relevant definitions found in Appendix II. It should be apparent to those skilled in the art how to implement the specifications and definitions of Appendix II. The next operation involves determining if the directive contains any 'children' in decision block 214. If there is a child, then the current context is set to the child directive in block 216, and pushed onto the stack in block 210. The steps in blocks 212 and 214 are repeated in order to navigate the DOM tree.

Referring to FIG. 3, if the directive does not contain a child or any more children (as determined in decision block 214), then the end tag of the directive is processed in block 218. The last operation in the directive processing involves popping the current directive context from stack (which was pushed in block 210) to restore the state data, as indicated in block 220. After this step, the directive processing is ended.

Figure 4:
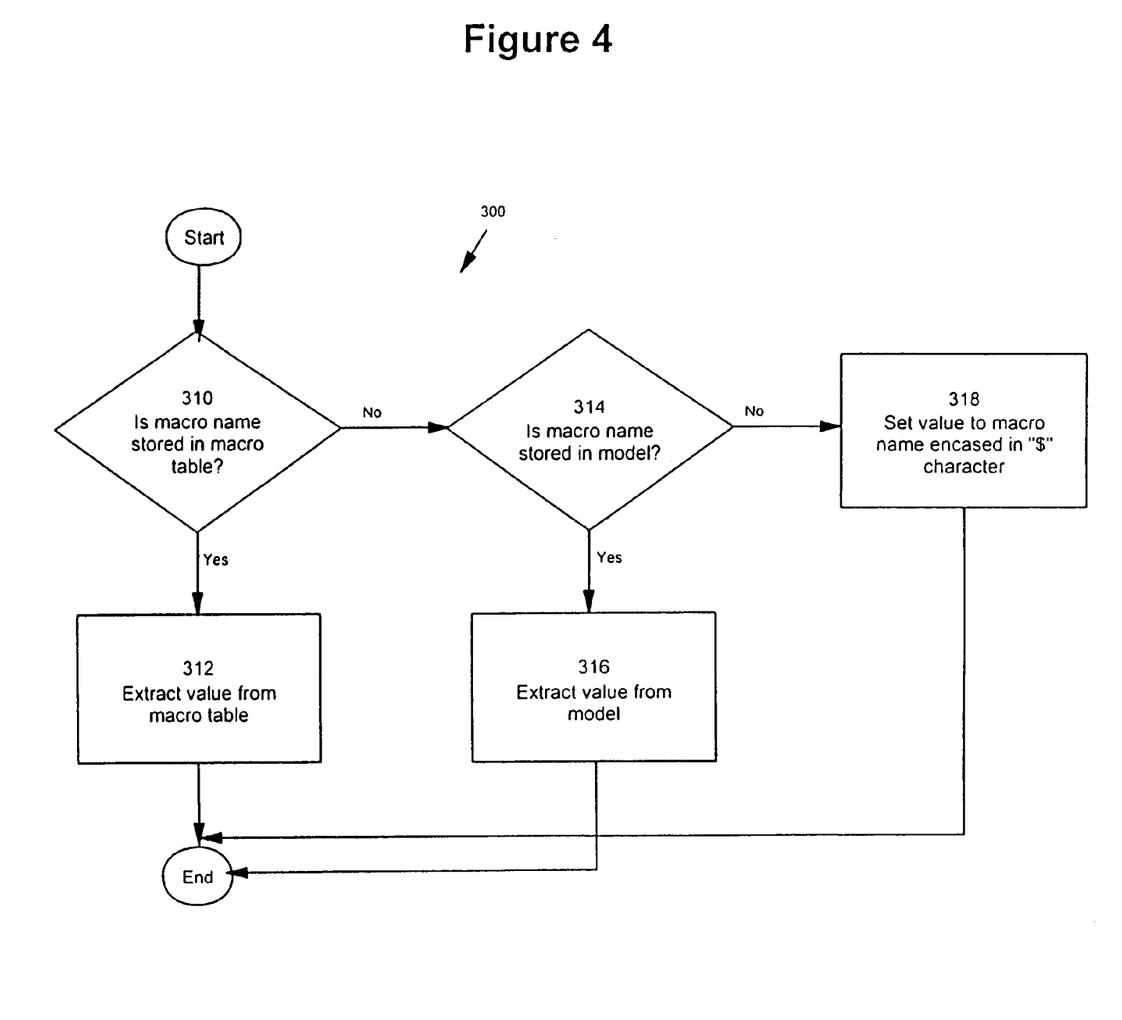
FIG. 4 shows in flowchart form the method steps for resolving a macro according to the present invention.

Reference is next made to FIG. 4 which shows the method steps embodied in a process for resolving the macro name as indicated by block 120 (FIG. 2). As shown in FIG. 4, the process for resolving the macro name is indicated generally by reference 300. The first step in resolving the macro name process 300 involves ascertaining if the macro name is stored in the macro table, as indicated by decision block 310. If the macro name is contained in the macro table, then the value for the macro name is extracted from the macro table, as indicated in block 312, and the process 300 is completed. If the macro name is not stored in the macro table (decision block 310), then a check is made to ascertain if the macro name is stored in the domain model, as indicated in decision block 314. If the macro name is stored in the model, then the value for the macro name is extracted from the model, as indicated in block 316, and the process 300 for resolving the macro name is completed. If the macro name is not stored in the model (as determined in decision block 314), then the value for the macro name is set to the name encased by a '$' character in the template file 12. After step 318, the process 300 is completed.

Figure 5:
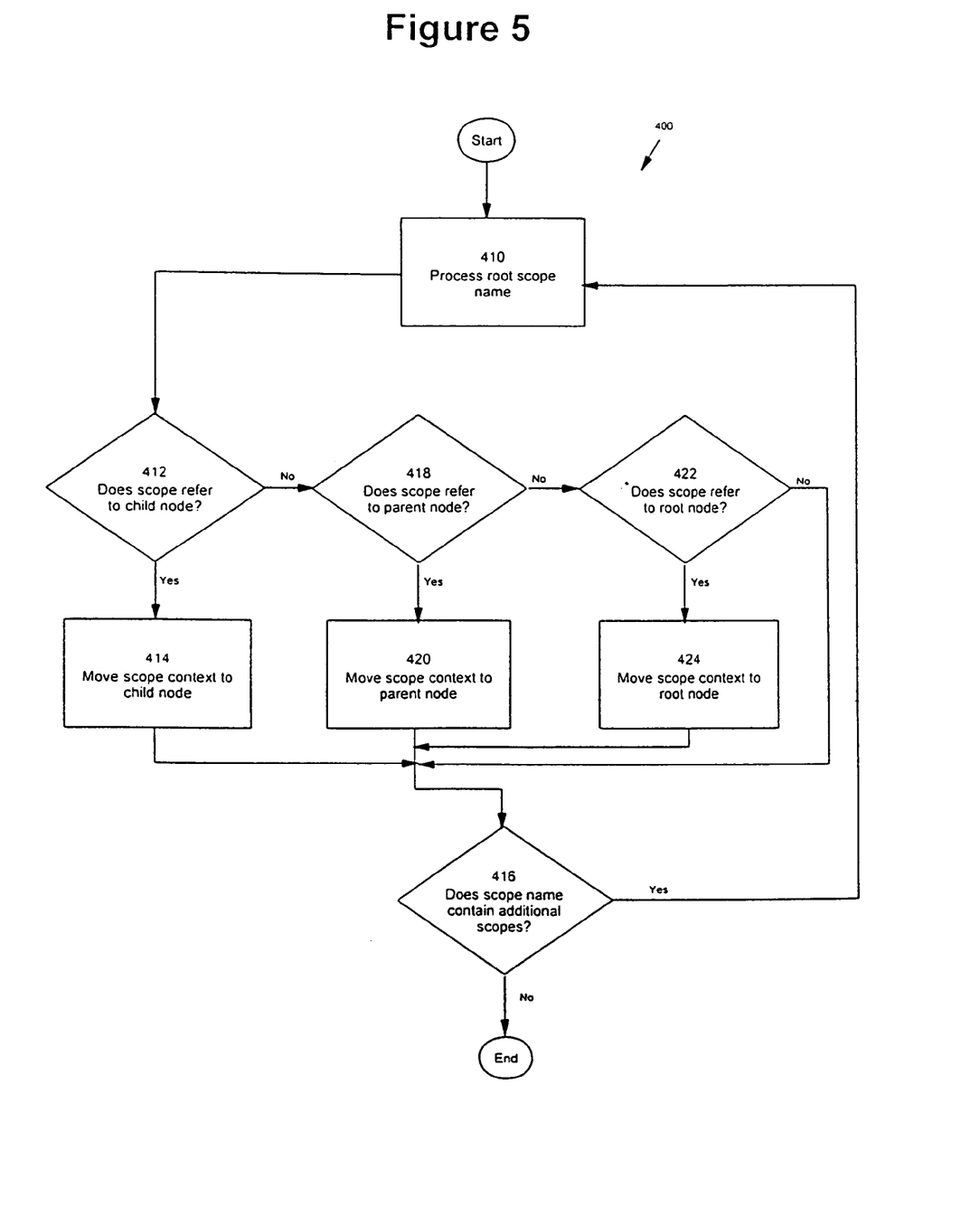
FIG. 5 shows in flowchart form the method steps for resolving scoping according to the present invention.

Reference is next made to FIG. 5, which shows the method steps embodied in a process for resolving the scoping of the macro name as indicated by block 130 (FIG. 2). As shown in FIG. 5, the process for resolving the scoping of the macro name, i.e. navigating the DOM tree, is indicated generally by reference 400. The first step in the process 400 for resolving the scope of the macro name involves processing the root scope name in block 410. Next, a determination is made in decision block 412 to determine if the scope refers to a child node in the DOM tree for the model. If the scope is a child node, then the scope context is moved to the child node, as indicated in block 414. After step 414, a check is made in decision block 416, to determine if the scope name contains any additional scopes. If there are additional scopes, then the scope name is processed in block 410 and decision block 412 as described above.

Referring to FIG. 5, if the scope name does not refer to a child node (as determined in decision block 412), then a check is made in decision block 418 to ascertain if the scope name refers to a parent node in the DOM tree. If yes, then the scope context is moved to the parent node as indicated in block 420. After this step, a check is made to ascertain if the scope name contains additional scopes in decision block 416, as described above. If the scope name does not correspond to the parent node (decision block 418), then a check is made in decision block 422 to determine if the scope name refers to the root node in the DOM tree. If the scope name refers to the root node, then the scope context is moved to the root node, as indicated by block 424. Next, a check is made in decision block 416 to determine if the scope name contains additional scopes as described above.

The operation of the mechanism 10 according to the present invention is further described with reference to two examples depicted in FIG. 6 and FIG. 7, respectively.

Figure 6:
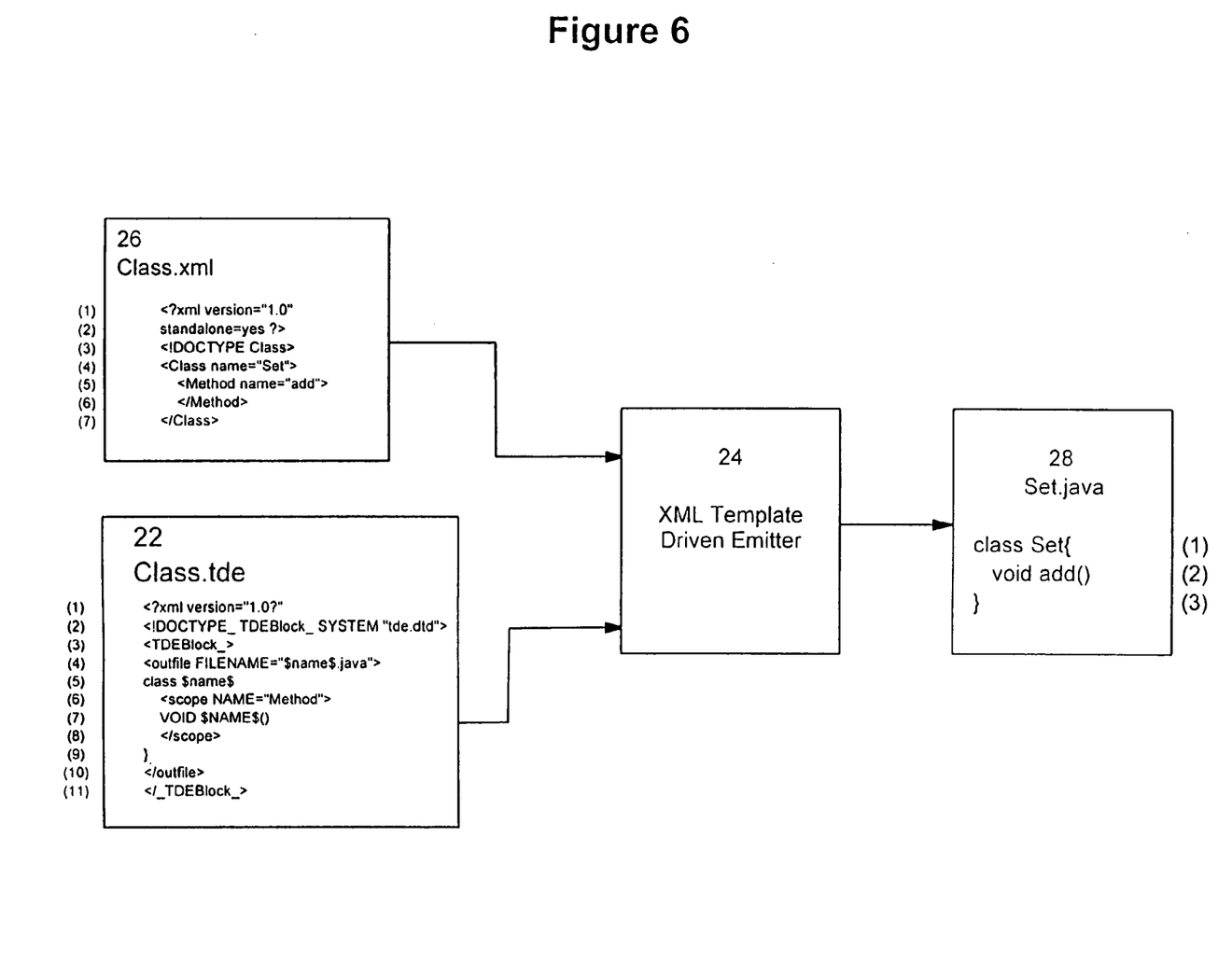
FIG. 6 shows in diagrammatic form a formatted output generated according to the present invention.

Reference is made to FIG. 6, which depicts a formatted output file 28 generated from a source data file 26 according to a template file 22. The template file 22 is processed according to a template driven emitter 24. The arrangement of the template file 22 and the template driven emitter 24 are as described above. In operation, the template driven emitter 24 reads the source data file 26 and creates a DOM tree. The template driven emitter 24 also reads the template file 22 and creates a DOM tree (as described above). When the template file 22 is first processed, the template driven emitter 24 sets the current context to the root element in both DOM trees. Subsequently, navigation of the DOM tree is controlled by the scope directive(s) contained in the template file 22. As shown in FIG. 6, the template file 22 defines the root element as 'TDEBlock' (Line 3). In Line 4, the template file 22 includes a directive which defines the formatted output file 28 named by a macro value. Line 6 of the template file 22 includes a scope directive which changes the context (i.e. navigates the DOM tree) to the 'Method'. As shown in FIG. 6, the generated output in the output file 28 is indicated by 'void add( )' in Line 2. The output file 28 is stored under the name 'Set.java', which was defined by the 'outfile' directive in the template file 22 (Line 4).

Figure 7:
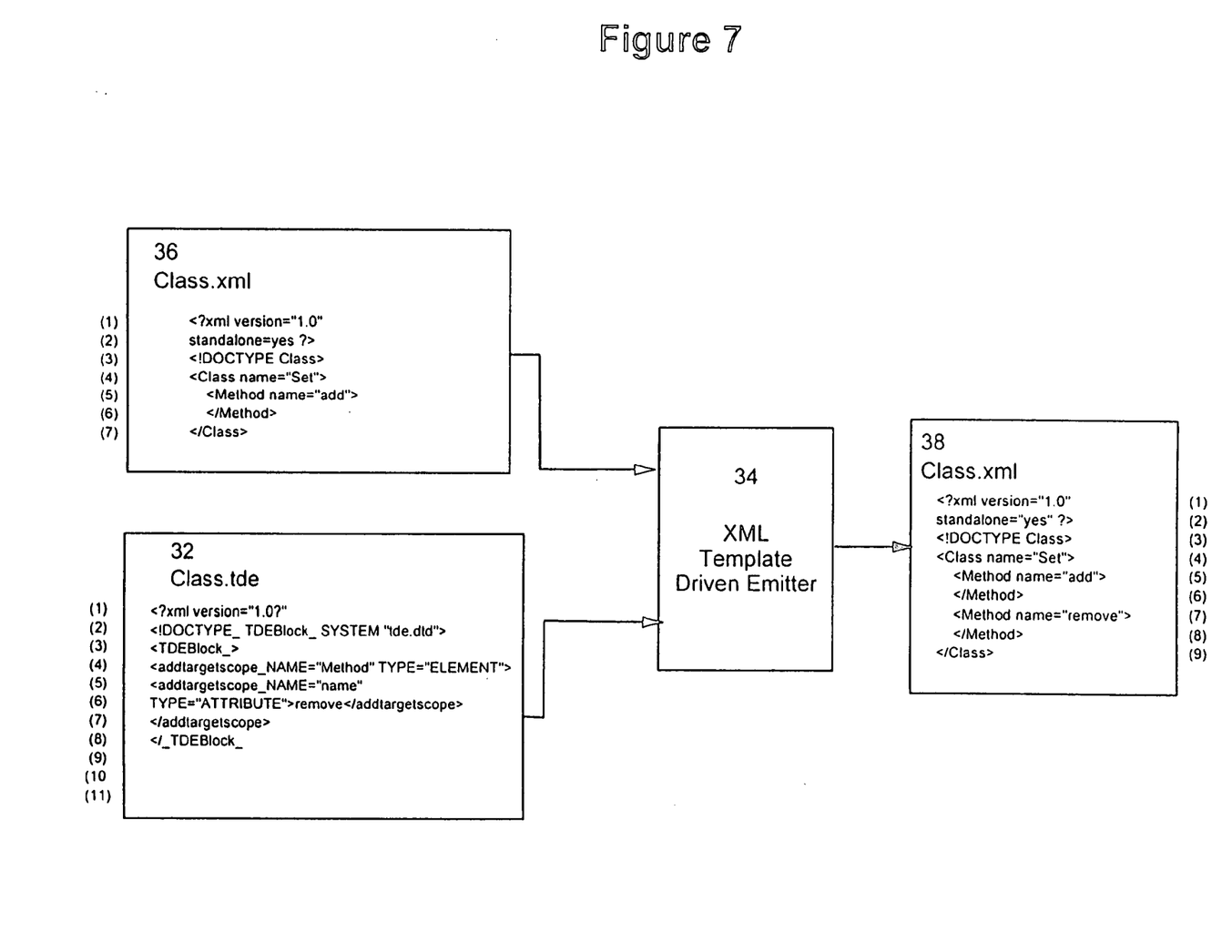
FIG. 7 shows in diagrammatic form a domain model manipulation example according to the present invention.

Reference is next made to FIG. 7, which shows an example of a DOM tree manipulation according to the present invention. As shown in FIG. 7, the template driven emitter 34 processes a template file 32 which modifies a source data file 36 to generate an output file 38. The output file 38 comprises the source file 36 associated with a modified DOM tree. As shown in FIG. 7, the template file 32 includes an 'addtargetscope' directive in Line 4 and another 'addtargetscope' directive in Line 5. As described above, the addtargetscope directive is used to insert an element into the DOM tree. For the template file 32, the first directive directs the addition of an element called 'Method' to the DOM tree. The second directive in the template file 32 directs the addition of an attribute 'name' to the element 'Method'. The element 'Method' with the attribute 'name' appears in Line 7 of the generated output file 38 as shown in FIG. 7. It will be appreciated that the data model is navigated in a symbolic manner, i.e. naming the object relationships as strings, rather than direct object references. Similarly, the attribute values are retrieved by naming the attribute string.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

Throughout the description and claims of this specification, the word "comprise" and variations of the word, such as "comprising" and "comprises", is not intended to exclude other additives, integers or processed steps.

While the preferred embodiment of this invention has been described in relation to the XML language, this invention need not be solely operate using the XML language. It will be apparent to those skilled in the art that the invention may equally be operable with other computer languages, such as SGML.

The invention is preferably implemented in a high level procedural or object-oriented programming language to communicate with a computer. However, the invention can be implemented in assembly or machine language, if desired. In any case, the language may be a compiled or interpreted language.

While aspects of the invention relate to certain computer language and other technological specifications (e.g. the XML specification), it should be apparent that classes, objects, components, tags and other such software and technological items referenced herein need not fully conform to the specification(s) defined therefor but rather may meet only some of the specification requirements. Moreover, the classes, objects, components, tags and other such software and technological items referenced herein may be defined according to equivalent specification(s) other than as indicated herein that provides equivalent or similar functionality, constraints, etc. For example, instead of the XML language specification, tags and other such software and technological items referenced herein may be defined according to the SGML specification where applicable and appropriate.

The invention may be implemented as a mechanism or a computer program product comprising a recording medium. Such a mechanism or computer program product may include, but is not limited to, CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A mechanism for manipulating information from a source data model and creating a target data model, said mechanism comprising:
   (a) a template module including a directive to extract and manipulate selected data of a source data model, said source data model comprising read-only data;
   (b) a template processing module to process said directive contained in said template module;
   (c) said template processing module further including a component to generate a first Document Object Model tree for navigating said template module to manipulate said source data model and create a target data model, and a component to generate a second Document Object Model tree for navigating said source data model; and
   wherein said template module includes at least one of a directive to manipulate the first Document Object Model tree and a directive to manipulate the second Document Object Model tree for navigating the source data model.

2. The mechanism as claimed in claim 1, wherein said template module further includes a directive to create said target data model, said target data model providing a repository for data obtained from said source data model.

3. The mechanism as claimed in claim 2, wherein said template module is expressed in Extensive Markup Language, said template module being defined according to a Document Type Definition.

4. The mechanism as claimed in claim 1, in an application development program and said source data model and said target data model define an object for an application program.

5. The mechanism as claimed in claim 4, wherein said template module is expressed in Extensive Markup Language, said template module being defined according to a Document Type Definition.

6. The mechanism as claimed in claim 1, wherein said template module is expressed in Extensive Markup Language, said template module being defined according to a Document Type Definition.

7. A method for manipulating selected data from a source data model, said method comprising:
   (a) defining a template file having a directive specifying data to be extracted and manipulated in a source data model, said source data model comprising read-only data;
   (b) generating a first Document Object Model tree for navigating said template file;
   (c) generating a second Document Object Model tree for navigating said source data model;
   (d) navigating said template file using said first Document Object Model tree and processing said directive to extract and manipulate selected data in said source data model using said second Document Object Model tree to facilitate creation of a target data model; and wherein said template file includes a directive for manipulating the second Document Object Model tree for navigating said source data model.

8. The method as claimed in claim 7, further including creating said target data model, said target data model providing a repository for the data obtained from said source data model.

9. The method as claimed in claim 7, wherein said template file is expressed in Extensive Markup Language, said template file being defined according to a Document Type Definition.

10. A computer program product for an application program for creating objects, said application program including a utility for manipulating information in a source data model and creating a target data model, said computer program product comprising:

a computer-readable recording medium;

means recorded on said medium for instructing a computer to perform:
   (a) defining a template file having a directive specifying data to be extracted and manipulated from a source data model, said source data model comprising read-only data;
   (b) generating a first Document Object Model tree for navigating said template file;
   (c) generating a second Document Object Model tree for navigating said source data model;
   (d) navigating said template file using said first Document Object Model tree and processing said directive to extract and manipulate selected data in said source data model using said second Document Object Model tree to facilitate creation of a target data model and wherein said template file includes a directive for manipulating the second Document Object Model tree for navigating said source data model.

11. The computer program product as claimed in claim 10, further including creating said target data model, said target data model providing a repository for the data obtained from said source data model.

12. The computer program product as claimed in claim 10, wherein said template file is expressed in Extensive Markup Language, said template file being defined according to a Document Type Definition.

13. A computer program product comprising computer-readable medium embodying means for instructing a computer to perform a method for manipulating selected data from a source data model, said method comprising:
   (a) defining a template file having a directive specifying data to be extracted and manipulated in a source data model, said source data model comprising read-only data;
   (b) generating a first Document Object Model tree for navigating said template file;
   (c) generating a second Document Object Model tree for navigating said source data model;
   (d) navigating said template file using said first Document Object Model tree and processing said directive to extract and manipulate selected data in said source data model using said second Document Object Model tree to facilitate creation of a target data model; and wherein said template file includes a directive for manipulating the second Document Object Model tree for navigating said source data model.

14. The computer program product as claimed in claim 13, further including creating said target data model, said target data model providing a repository for the data obtained from said source data model.

15. The computer program product as claimed in claim 13, wherein said template file is expressed in Extensive Markup Language, said template file being defined according to a Document Type Definition.

\* \* \* \* \*